United States Patent [19]

Kurematsu et al.

[11] Patent Number: 5,267,029
[45] Date of Patent: Nov. 30, 1993

[54] IMAGE PROJECTOR

[76] Inventors: Katsumi Kurematsu, c/o Canon Kabushiki Kaisha 30-2, 3-chome, Shimomaruko, Ohta-ku, Tokyo; Shigeru Oshima, c/o Canon Kabushiki Kaisha, Kosugi-Jigyosho 53, Imaikami-cho, Nakahara-ku, Kawasaki-shi, Kanagawa-ken; Nobuo Minoura, c/o Canon Kabushiki Kaisha 30-2, 3-chome, Shimomaruko, Ohta-ku, Tokyo, all of Japan

[21] Appl. No.: 830,490

[22] Filed: Jan. 31, 1992

Related U.S. Application Data

[63] Continuation of Ser. No. 632,950, Dec. 21, 1990.

[30] Foreign Application Priority Data

Dec. 28, 1989 [JP] Japan ................... 1-344845
Jan. 16, 1990 [JP] Japan ................... 2-4519

[51] Int. Cl.⁵ ............................................. H04N 9/31
[52] U.S. Cl. ................................ 358/60; 358/61; 358/232
[58] Field of Search ........................ 358/60-64, 358/59, 230-234; 353/30, 31, 33, 32, 34, 37; 359/41

[56] References Cited

U.S. PATENT DOCUMENTS

| | | | |
|---|---|---|---|
| 4,864,390 | 9/1989 | McKechnie et al. | 358/61 |
| 4,983,032 | 1/1991 | Van Den Brandt | 358/60 |
| 4,989,076 | 1/1991 | Owada et al. | 358/61 |
| 5,060,058 | 10/1991 | Goldenberg et al. | 388/61 |
| 5,105,263 | 4/1992 | Shioda | 358/60 |
| 5,115,305 | 5/1992 | Baur et al. | 358/61 |

FOREIGN PATENT DOCUMENTS

| | | |
|---|---|---|
| 3720375 | 12/1988 | Fed. Rep. of Germany . |
| 51-52233 | 8/1976 | Japan . |
| 60-179723 | 9/1985 | Japan . |
| 61-90584 | 5/1986 | Japan . |
| 61-102892 | 5/1986 | Japan . |
| 0150487 | 7/1986 | Japan . |
| 61-167297 | 7/1986 | Japan . |
| 62-1391 | 1/1987 | Japan . |
| 62-125791 | 6/1987 | Japan . |
| 63-58414 | 3/1988 | Japan . |
| 0121818 | 5/1988 | Japan ........................... 358/60 |
| 63-197913 | 8/1988 | Japan . |
| 0267089 | 11/1988 | Japan . |
| 0363767 | 4/1990 | Japan . |
| 87/00640 | 1/1987 | PCT Int'l Appl. . |
| WO8700640 | 1/1987 | PCT Int'l Appl. . |
| 87/09102 | 11/1988 | PCT Int'l Appl. . |
| WO8809102 | 11/1988 | PCT Int'l Appl. . |
| 89/01272 | 2/1989 | PCT Int'l Appl. . |
| WO8901272 | 2/1989 | PCT Int'l Appl. . |

*Primary Examiner*—James J. Groody
*Assistant Examiner*—Michael H. Lee
*Attorney, Agent, or Firm*—Morgan & Finnegan

[57] ABSTRACT

An image projector has a device for supplying a first light exhibiting a first color and a second light exhibiting a second color differing from the first color, a first generator for modulating the first light and generating a first image by polarized lights whose planes of polarization are orthogonal to each other, a second generator for modulating the second light and generating a second image by polarized lights whose planes of polarization are orthogonal to each other, an optical coupler for reflecting one of the polarized lights from the first generator and transmitting the other therethrough and transmitting therethrough one of the polarized lights from the second generator and reflecting the other, and a projection optical system for receiving the one polarized light from the first generator and the one polarized light from the second generator through the coupler, and projecting the first and second images by these polarized lights.

22 Claims, 4 Drawing Sheets

IMAGE PROJECTOR

This is a continuation of co-pending application Ser. No. 07/632,950, filed on Dec. 21, 1990.

BACKGROUND OF THE INVENTION

This invention relates to a projector.

Heretofore, in a projector using a liquid crystal light modulator, as described in Japanese Laid-Open Patent Application No. 51-52233, Japanese Laid-Open Patent Application No. 60-179723, Japanese Laid-Open Patent Application No. 61-102892, Japanese Laid-Open Patent Application No. 61-167297, Japanese Laid-Open Patent Application No. 62-125791, Japanese Laid-Open Patent Application No. 62-1391, Japanese Laid-Open Patent Application No. 63-58414, etc., optical images from liquid crystal devices of different color lights (hereinafter referred to as "LCDs") have been color-synthesized by a dichroic mirror and projected onto a screen by a projection lens, and although not particularly mentioned, sheet-like polarizing filters virtually made integral with the LCDs have been used as the polarizers and analyzers of the LCDs.

However, in the prior art described above, when light applied to the LCDs is intensified to improve luminance, particularly the polarizing filters on the analyzer side generate heat due to absorption of the light. This heat generation increases the temperature of the liquid crystal of the LCDs and further causes a change in the phase of the liquid crystal, thus reducing the function of the LCDs.

In order to eliminate such temperature rise of the liquid crystal caused by the absorption of light of the polarizing filters, it would occur to mind to use polarizing beam splitters instead of the polarizing filters as the analyzers. However, if such polarizing beam splitters are arranged correspondingly to the LCDs of different color lights, there will arise the problem that the system becomes bulky.

SUMMARY OF THE INVENTION

It is the object of the present invention to provide a compact color image projector using a light modulator.

To achieve this object, the image projector of the present invention in a first form thereof has means for supplying a first light exhibiting a first color and a second light exhibiting a second color differing from said first color, a first generator for modulating said first light and generating a first image by polarized lights whose planes of polarization are orthogonal to each other, a second generator for modulating said second light and generating a second image by polarized lights whose planes of polarization are orthogonal to each other, an optical coupler for reflecting one of said polarized lights from said first generator and transmitting the other therethrough and transmitting therethrough one of said polarized lights from said second generator and reflecting the other, and a projection optical system for receiving said one polarized light from said first generator and said one polarized light from said second generator through said coupler, and projecting said first and second images by these polarized lights.

Also, to achieve the above object, the image projector of the present invention in a second form thereof has means for supplying first, second and third lights differing in color from one another and polarized in predetermined directions, respectively, a first liquid crystal light modulator for rotating the plane of polarization of a certain part of said first light in conformity with an input signal to thereby generate a first image by polarized lights whose planes of polarization are orthogonal to each other, a second liquid crystal light modulator for rotating the plane of polarization of a certain part of said second light in conformity with the input signal to thereby generate a second image by polarized lights whose planes of polarization are orthogonal to each other, a third liquid crystal light modulator for rotating the plane of polarization of a certain part of said third light in conformity with the input signal to thereby generate a third image by polarized lights whose planes of polarization are orthogonal to each other, a dichroic mirror disposed at a location whereat said polarized lights from said first and second liquid crystal light modulators intersect each other for synthesizing said polarized lights and directing the synthesized light to a predetermined optical path, a polarizing beam splitter disposed in said optical path for transmitting therethrough each one of said polarized lights from said first and second liquid crystal light modulators and reflecting each of the other polarized lights and on the other hand, reflecting one of the polarized lights from said third liquid crystal light modulator and transmitting the other polarized light therethrough to thereby take out and synthesize each said one polarized light from said first, second and third liquid crystal light modulators, and a projection lens system for projecting said first, second and third images by each said synthesized one polarized light.

Also, to achieve the above object, the image projector of the present invention in a third form thereof has means for supplying first, second and third lights differing in color from one another and polarized in predetermined directions, respectively, a first liquid crystal light modulator for rotating the plane of polarization of a certain part of said first light in conformity with an input signal to thereby generate a first image by polarized lights whose planes of polarization are orthogonal to each other, a second liquid crystal light modulator for rotating the plane of polarization of a certain part of said second light in conformity with the input signal to thereby generate a second image by polarized lights whose planes of polarization are orthogonal to each other, a third liquid crystal light modulator for rotating the plane of polarization of a certain part of said third light in conformity with the input signal to thereby generate a third image by polarized lights whose planes of polarization are orthogonal to each other, a first polarizing beam splitter disposed at a location whereat said polarized lights from said first and second liquid crystal light modulators intersect each other for reflecting one of said polarized lights from said first liquid crystal light modulator and transmitting the other polarized light therethrough and on the other hand, transmitting therethrough one of said polarized lights from said second liquid crystal light modulator and reflecting the other polarized light to thereby take out and synthesize each said one polarized light from said first and second liquid crystal light modulator, and a second polarizing beam splitter for taking out said one polarized light from said third liquid crystal light modulator, and projects said first, second and third images by each said one polarized light from said first and second polarizing beam splitter.

In a preferred form of the present invention, said light supplying means has a lamp emitting white light, a converter for converting said white light into a white rectilinearly polarized light, and an optical system provided with a plurality of dichroic mirrors for dividing said white polarized light by each color.

The colors of said first, second and third lights are such that for example, one of them is red and another is green and the remainder is blue. In the present invention, a single projection lens system, a pair of projection lens systems or three projection lens systems are usable as the projection optical system for projecting red, green and blue images. Preferably, a single projection lens system or a pair of projection lens systems may be used.

In the present invention, use is made of a polarizing beam splitter comprising an optical member of cubic or other configuration comprising a pair of prisms cemented together and multilayer film formed on the cemented surface thereof, or an optical member comprising a transparent plate having multilayer film formed thereon. The configuration of the dichroic mirror may be cubic or plate-like. In a preferred form of the present invention, each optical member is arranged so that the light dividing surfaces of these optical members may be parallel to each other. This is for the purpose of making the system compact.

The liquid crystal light modulators used in the present invention may be ones having a liquid crystal layer of the ECB (electrically controlled birefringence) type, ones provided with a liquid crystal layer of the 90° twisted nematic type, or ones provided with a liquid crystal layer of the 45° twisted nematic type, and in any of these, the liquid crystal molecules of the liquid crystal layer are driven by an electric field or the like to change the optical characteristic thereof, thereby effecting the control of the polarization of light. Also, the liquid crystal light modulators may be of the transmission type which modulates incident light while transmitting the incident light therethrough, or of the reflection type which modulates incident light while reflecting the incident light.

DESCRIPTION OF THE PREFERRED EMBODIMENTS

Some embodiments of the present invention will hereinafter be described with reference to the drawings.

Figure 1:
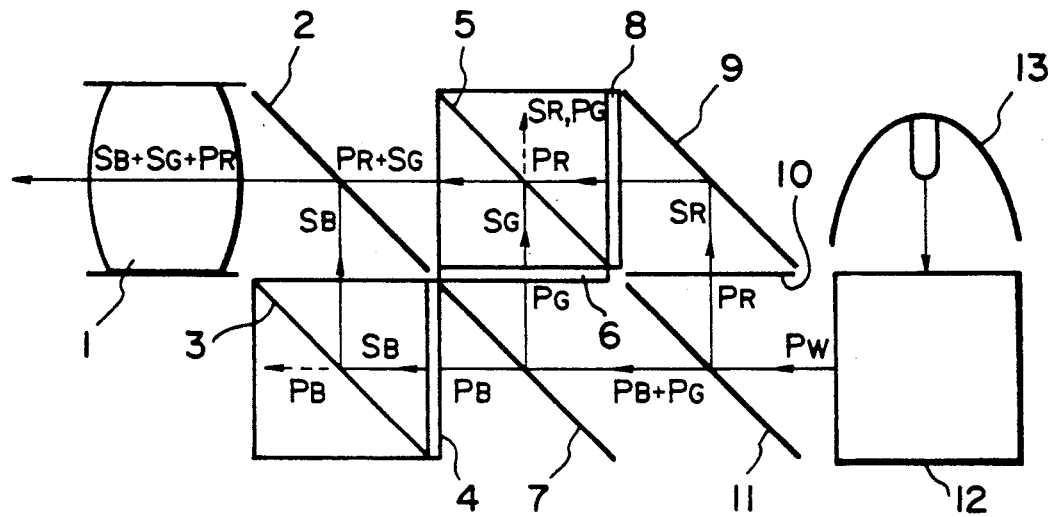
FIG. 1 shows a first embodiment of the projector of the present invention.

FIG. 1 shows a first embodiment of the present invention.

The projector of this embodiment is of such a construction that white light emitted from a white light source (hereinafter referred to as the "light source") 13 provided with a high luminance lamp is converted into a polarized light whose plane of polarization is uniform by a polarization converting module 12, whereafter said polarized light is separated into lights of red, green and blue colors (hereinafter referred to as the R light, the G light and the B light, respectively) which are rectilinearly polarized lights by first and second dichroic mirrors (hereinafter referred to as the "DMs") 11 and 17, a total reflection mirror 9 and a λ/2 plate 10, and first to third liquid crystal light bulbs (hereinafter referred to as the "LCDs") 8, 6 and 4 for generating red, green and blue images corresponding to the respective color lights are irradiated with the separated R light, G light and B light and further, the B light, G light and R light transmitted through the respective LCDs 8, 6 and 4 are synthesized by a third dichroic mirror 2 (hereinafter referred to as the "DM2") and polarizing beam splitters (hereinafter referred to as the "BSs") 3 and 5 disposed on the projection lens system 1 side, as will be described later, and are directed to the projection lens 1 and the red, green and blue images are enlargedly projected onto a screen, not shown, by the projection lens 1.

The polarization converting module 12 may be one identical to that disclosed in Japanese Laid-Open Patent Application No. 90584/1986 or Japanese Laid-Open Patent Application No. 197913/1988, and in the present embodiment, it is set so that the plane of polarization of emergent light may be P-polarized light relative to the first DM 11 located at the destination of emergence of the emergent light.

The LCDs 8, 6 and 4 are of the transmission type which forms a blue image, a green image and a red image, respectively, and modulate the illuminating light for each picture element constituting each color image by primary color image signals for the respective color images. This modulation is to rotate the plane of polarization of the emergent light by 90° relative to the incident light, and the LCDs 8, 6 and 4 each are a light modulator provided with a 90° twisted nematic liquid crystal layer.

The first DM 11 has the characteristic of transmitting the G light and the B light therethrough and reflecting the R light, the second DM 7 has the characteristic of transmitting the B light therethrough and reflecting the R light and the G light, and the third DM 2 has the characteristic of transmitting the R light and the G light therethrough and reflecting the B light.

Parallel white light is emitted from the light source 13, and the white light is converted into P-polarized white light $P_W$ by the polarization converting module 12 and emerges. This polarized white light $P_W$ enters the first DM 11 located at the destination of emergence thereof, and in this first DM 11, the R light component $P_R$ is reflected and travels toward the λ/2 plate 10 located at the destination of reflection thereof, and a light component ($P_G + P_B$) including the G light component and the B light component which are the other components of the polarized white light $P_W$ is transmitted through the λ/2 plate 10 and travels toward the second DM 7 located at the destination of emergence thereof. As regards the light component ($P_G + P_B$) transmitted through the first DM 11, the G light $P_G$ is reflected by the second DM 7 and the B light $P_B$ is transmitted therethrough. The reflected G light $P_G$ becomes the illuminating light of the second LCD 6 for green image, and the transmitted B light $P_B$ becomes the illuminating light of the third LCD for blue image.

On the other hand, the aforementioned R light $P_R$ which has been reflected by the first DM 11 and has travelled toward the λ/2 plate 10 has its plane of polarization rotated by 90° and is converted into S-polarized R light $S_R$ by being transmitted through the $\lambda/2$ plate 10, whereafter it is reflected by the total reflection mirror 9 and becomes the illuminating light of the first LCD 8 for red image. In this first LCD 8, the R light $S_R$ transmitted through a picture element corresponding to the light portion of the primary color video signal has its plane of polarization rotated by 90° and is thereby made into P-polarized R light $P_R$, and the R light $S_R$ transmitted through a picture element corresponding to the dark portion of the primary color video signal has its plane of polarization not rotated is thereby made into S-polarized R light $S_R$, and these lights emerge from the first LCD 8. The R light $P_R$ and R light $S_P$ which have thus emerged travel toward the BS 5 located at the destination of emergence thereof, and the R light $P_R$ is transmitted through the BS 5, while the R light $S_R$ is reflected by the BS 5 and is deviated from the projection optical path. That is, the BS 5 functions as an analyzer for the first LCD 8. Therefore, the first LCD 8 is of a construction which does not have a polarizing filter as an analyzer.

Also, in the second LCD 6 for green image which uses as the illuminating light the G light $P_G$ reflected by the second DM 7, the G light $P_G$ transmitted through a picture element corresponding to the light portion of the primary color video signal has its plane of polarization rotated by 90° and is thereby made into S-polarized G light $S_G$, and the G light $P_G$ transmitted through a picture element corresponding to the dark portion of the primary color video signal has its plane of polarization not rotated and is thereby made into P-polarized G light $P_G$, and these lights emerge from the second LCD 6. The G light $S_G$ and G light $P_G$ which have thus emerged travel toward the BS 5 located at the destination of emergence thereof and the G light $P_G$ is transmitted through the BS 5 and is deviated from the projection optical path, while the G light $S_G$ is reflected by the BS 5 and emerges from the first LCD 8 and is synthesized with the R light $P_R$ transmitted through the BS 5 and emerges as a light component ($P_R + S_G$) That is, the BS 5 functions also as the analyzer of the second LCD 6 and further, effects color synthesis of the R light $P_R$ and the G light $S_G$. Accordingly, the second LCD 6, like the first LCD 8, is of a construction which does not have a polarizing filter as an analyzer.

On the other hand, in the third LCD 4 for blue image which uses as the illuminating light the B light $P_B$ transmitted through the second DM 7, as in the case of the aforedescribed second LCD 6, the B light $P_B$ transmitted through a picture element corresponding to the light portion of the primary color video signal has its plane of polarization rotated by 90° and is thereby made into S-polarized light $S_B$ and emerges, and the B light $P_B$ transmitted through a picture element corresponding to the dark portion of the primary color video signal has its plane of polarization not rotated and emerges as P-polarized B light $P_B$. The B light $P_B$ and B light $S_B$ which have thus emerged from the third LCD 4 travel toward the BS 3 located at the destination of emergence thereof, and in the BS 3, the B light $S_B$ is reflected and travels toward the third DM 2 located at the destination of reflection thereof, while the B light $P_B$ is transmitted through the BS 3 and is deviated from the projection optical path. That is, this BS 3, like the aforedescribed BS 5, functions as the analyzer of the third LCD 4 and therefore, the LCD 4, like the aforedescribed first and second LCDs 8 and 6, is of a construction which does not have a polarization filter as an analyzer.

The B light $S_B$ reflected by the BS 3 is reflected on the third DM 2 and is synthesized with the light component ($P_R + S_G$) which has emerged from the BS 5 and is thereby made into synthesized light ($S_B + S_G + P_R$) and emerges toward the projection lens 1, and the red, green and blue images are enlargedly projected onto the screen, not shown, through the projection lens 1.

As described above, according to the present embodiment, the light corresponding to the dark portion of the image is emitted to the outside of the projection optical path and a polarizing filter as an analyzer is not used in the LCDs. Further, the BS as an analyzer (in the present embodiment, the BS 5) serves also as a color synthesizer and therefore, the optical system between the projection lens 1 and the LCDs 4, 6, 8 is not complicated and the back focal length does not become great. Also, because of the polarization converting module 12 being used, the white light emitted from the light source is converted into rectilinearly polarized light whose plane of polarization is uniform with a small loss and the rate of utilization of light is high.

A second embodiment of the present invention will now be described with reference to FIG. 2.

Figure 2:
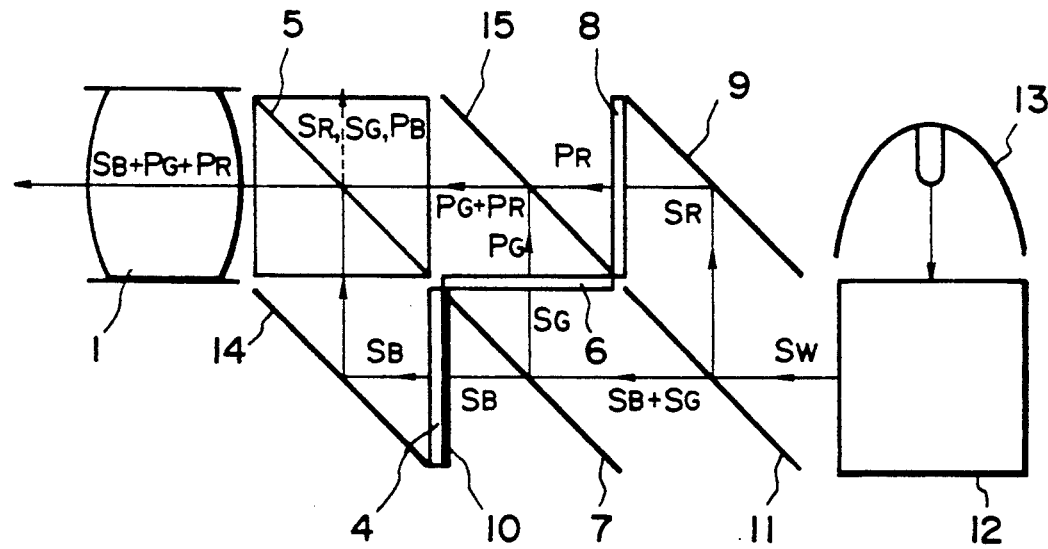
FIG. 2 shows a second embodiment of the present invention.

FIG. 2 shows the second embodiment of the present invention.

The construction of the present embodiment is basically similar to that of the aforedescribed first embodiment and in FIG. 2, portions identical to those shown in FIG. 1 are given reference characters identical to those in FIG. 1.

The polarization converting module 12 of the present embodiment is set so that the emergent light therefrom may become S-polarized white light $S_W$. This polarized white light $S_W$ is separated into lights of different colors (R light $S_R$, G light $S_G$ and B light $S_B$) by a first dichroic mirror (DM) 11 and a second dichroic mirror (DM) 7. The R light $S_R$, after separated by the first DM 11, is reflected by a total reflection mirror 9 and becomes the illuminating light of a first LCD 8 for red image. The G light $S_G$, with the B light $S_B$, is transmitted through the first DM 11, whereafter it is reflected by the second DM 7 and is separated from the B light $S_B$ and becomes the illuminating light of a second LCD 6 for green image. The B light $S_B$ is transmitted through the second DM 7, whereafter it passes through a $\lambda/2$ plate 10 provided adjacent to the entrance surface of a third LCD 4 for blue image, and has its plane of polarization rotated by 90° by the $\lambda/2$ plate 10 and becomes P-polarized B light $P_B$ and provides the illuminating light of the third LCD 4.

The R light $S_R$ which has become the illuminating light of the first LCD 8 is subjected to modulation by the first LCD 8 and emerges as P-polarized R light $P_R$ when it is transmitted through a picture element corresponding to the light portion of the first LCD 8, and is not subjected to modulation and emerges as S-polarized R light $S_R$ when it is transmitted through a picture element corresponding to the dark portion of the first LCD 8. The R light $P_R$ and R light $S_R$ travel toward a third dichroic mirror (DM) 15 located at the destination of emergence thereof and having the characteristic of reflecting G light and B light and transmitting R light therethrough. Also, in the case of the second LCD 6, as in the case of the first LCD 8, the G light $S_G$ which has become the illuminating light thereof is subjected to modulation by the second LCD 6 and emerges as G light $P_G$ when it is transmitted through a picture element corresponding to the light portion of the second LCD 6, and is not subjected to modulation and emerges as G light $S_G$ when it is transmitted through a picture element corresponding to the dark portion of the second LCD 6. The G light $P_G$ and G light $S_G$ which have thus emerged travel toward the third DM 15 located at the destination of emergence thereof.

The R light $P_R$ and R light $S_R$ which have emerged from the first LCD 8 and the G light $P_G$ and G light $S_G$ which have emerged from the second LCD 6 are synthesized by the third DM 15, and travel as a light component ($P_G + P_R$) corresponding to the light portion and a light component ($S_G + S_R$), not shown, corresponding to the dark portion which has a plane of polarization orthogonal to the plane of polarization of the light component ($P_G + P_R$) toward the BS 5 located at the destination of emergence thereof.

On the other hand, the P-polarized B light $P_B$ which has become the illuminating light of the third LCD 4 as previously described is subjected to modulation by the third LCD 4 and emerges as S-polarized B light $S_B$ when it is transmitted through a picture element corresponding to the light portion of the third LCD 4, and is not subjected to modulation by the third LCD 4 and emerges as B light $P_B$ when it is transmitted through a picture element corresponding to the dark portion of the third LCD 4. The B light $P_B$ and B light $S_B$ which have thus emerged are reflected by a total reflection mirror 14 located at the destination of emergence thereof, and further travel toward the BS 5 located at the destination of reflection thereof. The light components ($P_G + P_R$) and ($S_G + S_R$) which have emerged from the third DM 15 and the B light $P_B$ and B light $S_B$ reflected by the total reflection mirror 14 enter the BS 5, and the B light $P_B$ corresponding to the dark portion of the third LCD 4 is transmitted through the BS 5 and is deviated from the projection optical path and further, the light component ($S_R + S_G$) corresponding to the dark portions of the first and second LCDs 8 and 6 is reflected by the BS 5 and is deviated from the projection optical path. Also, the B light $S_B$ corresponding to the light portion of the third LCD 4 is reflected by the BS 5 and therefore is synthesized with the light component ($P_G + P_R$) corresponding to the light portions of the first and second LCDs 8 and 6 and transmitted through the BS 5 and becomes synthesized light ($S_B + P_G + P_R$) That is, this BS 5 has the color synthesizing function and at the same time, provides an analyzer for the LCDs 8, 6 and 4. Accordingly, again in the present embodiment, the LCDs 4, 6 and 8 are of a construction which does not have a polarizing filter as an analyzer.

The synthesized light ($S_B + P_G + P_R$) synthesized by the BS 5 is enlargedly projected onto an outside screen through the projection lens 1.

Again in the present embodiment, as in the aforedescribed embodiment, each LCD is of a construction which does not require a polarizing filter. Also, the back focal length is similar to that in the previous embodiment.

A third embodiment of the present invention will now be described.

Figure 3:
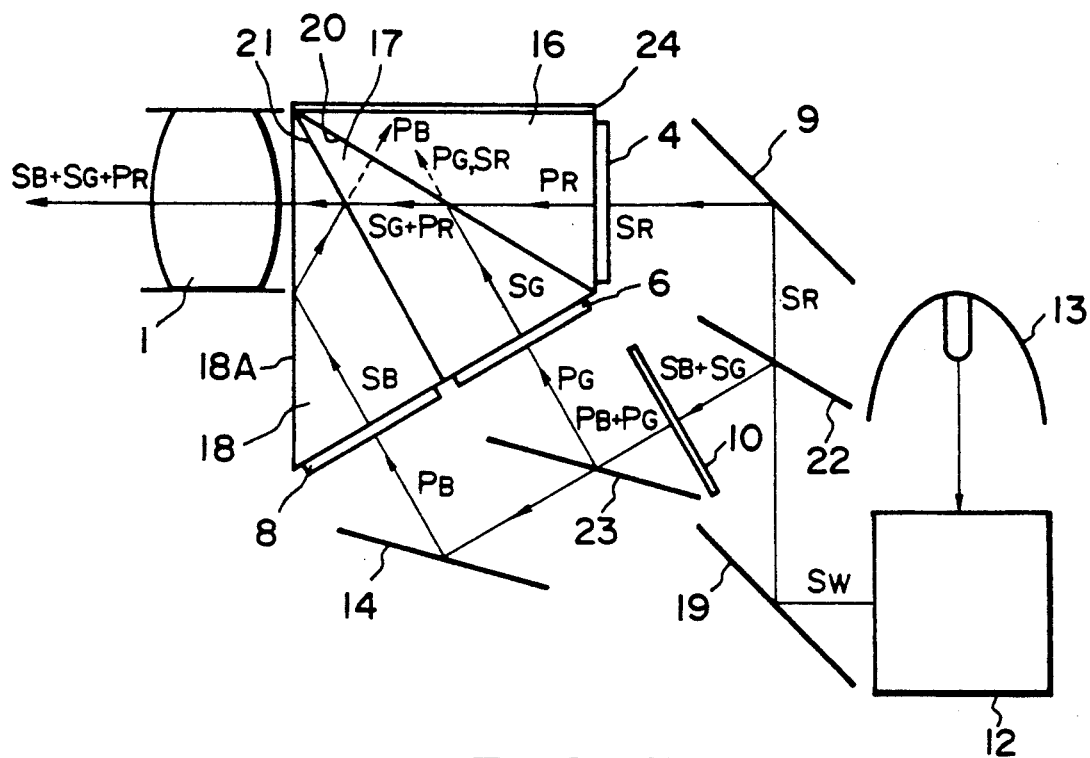
FIG. 3 shows a third embodiment of the present invention.

FIG. 3 shows the third embodiment of the present invention.

The present embodiment is characterized in that triangle pole type first to third prisms 16, 17 and 18 each having as a cross-section a right-angled triangle having interior angles of 30°, 60° and 90° are joined together, a first BS 20 is provided on the interface between the first prism 16 and the second prism 17 and as BS 21 is provided on the interface between the second prism 17 and the third prism 18 to thereby constitute a color synthesizing optical system.

This color synthesizing optical system is such that in the cross-sections of the first to third prisms 16, 17 and 18, with each vertex of the interior angle 30° as the center, the first and second prisms 16 and 17 are joined together by the sides thereof corresponding to the oblique lines opposed to the vertex of 90° and the second and third prisms 17 and 18 are joined together by the sides thereof opposed to the vertex of the interior angle 60°. Further, in the cross-sections of the first to third prisms 16, 17 and 18, the sides thereof opposed to the vertex of the interior angle 30° provide entrance portions for color lights (R light, G light and B light), and a third LCD 4 for a red image, a second LCD 6 for green image and a first LCD 8 for blue image are attached to the entrance portions.

Figure 4:
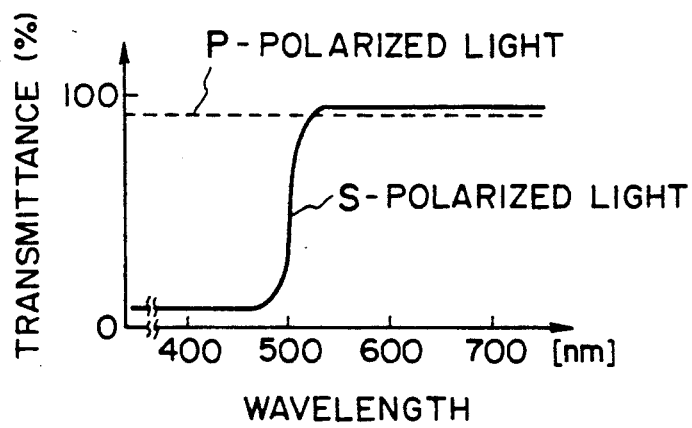
FIG. 4 is a graph showing the characteristic of a polarizing beam splitter 21 shown in FIG. 3.

The second BS 21 provided on the interface between the second prism 17 and the third prism 18 has the transmitting characteristic as shown in FIG. 4, and transmits all wavelengths therethrough when P-polarized light enters it, but transmits therethrough lights of more than a wavelength of about 500 nm and reflects S-polarized lights of the other wavelengths. That is, in S-polarized lights, B light (a wavelength of 500 nm or less) is reflected and R light (a wavelength of 580 nm or more) and G light (a wavelength of 500–580 nm) are transmitted.

Also, in the fore stage portion of the above-described color synthesizing optical system, there is provided a color separating optical system for separating white color emitted by the power source into various color lights, said separating optical system being comprised of first and second dichroic mirrors (DM) 22 and 23, total reflection mirrors 9, 14, 19, a $\lambda/2$ plate 10 and a polarization converting module 12.

The lights of various colors separated by this color separating optical system are designed to enter perpendicularly to the entrance surfaces of the first to third LCDs 8, 6 and 4 attached to the entrance portion of the aforedescribed color synthesizing optical system, and particularly the optic axis concerned with the third LCD 4 is continuous from the projection optical path of the projection lens 1. Therefore, the air interface 18A of the third prism 18 which is the exit portion of the color synthesizing optical system forms an angle of 90° with respect to the projection optical path of the projection lens 1.

Further, the side of the first prism 16 which is opposed to the vertex of the interior angle 60° is parallel to the aforementioned projection optical path, and is provided with a light absorbing layer 24 for absorbing the color light component which has deviated from the projection optical path.

The operation of the present embodiment will now be described. The white light from the light source 13 is converted into S-polarized white light $S_W$ by the polarization converting module 12 and emerges therefrom. This polarized white light $S_W$ is reflected by the total reflection mirror 19 and arrives at the first DM 22 having the characteristic of transmitting R light therethrough and reflecting B light and G light. The polarized white light $S_W$ is divided into R light $S_R$ and a light component ($S_B + S_G$) by the first DM 22, and the R light $S_R$ transmitted through the first DM 22 is reflected by the total reflection mirror 9 and becomes the illuminating light of the third LCD 4. Also, the light component ($S_B+S_G$) reflected by the first DM 22 is converted into a P-polarized light component ($P_B+P_G$) by the λ/2-plate 10, whereafter it is divided into G light $P_G$ and B light $P_B$ by the second DM 23 having the characteristic of transmitting the B light therethrough and reflecting the R light and G light, and the G light $P_G$ reflected by the second DM 23 becomes the illuminating light of the second LCD 6. The B light $P_B$ transmitted through the second DM 23 is reflected by the total reflection mirror 14 and becomes the illuminating light of the first LCD 8.

As regards the aforedescribed R light $S_R$ which has become the illuminating light of the third LCD 4, as in the aforedescribed embodiments, the portion (image) thereof corresponding to the light portion is subjected to modulation and emerges as P-polarized R light $P_R$ from the third LCD 4 and the portion thereof corresponding to the dark portion is not subjected to modulation and emerges as R light $S_R$ from the third LCD 4.

Likewise, as regards the G light $P_G$ and B light $P_B$ which have become the illuminating lights of the first and second LCDs 8 and 6, the portions (picture elements) thereof corresponding to the light portions are subjected to modulation and emerge as S-polarized G light $S_G$ and B light $S_B$ from the first and second LCDs 8 and 6, respectively, and the portions thereof corresponding to the dark portions are not subjected to modulation and emerge as G light $P_G$ and B light $P_B$ from the first and second LCDs 8 and 6, respectively.

The R light $P_R$ and R light $S_R$ which have emerged from the third LCD 4 travel toward the interface between the first prism 16 and the second prism 17, and when they pass through said interface, the R light $S_R$ corresponding to the dark portion is reflected as indicated by dotted line by the first BS 20 provided on said interface and deviates from the projection optical path, while the R light $P_R$ corresponding to the light portion is transmitted through the first BS 20. The G light $P_G$ and G light $S_G$ which have emerged from the second LCD 6 likewise travel toward the interface between the first prism 16 and the second prism 17, and the G light $P_G$ corresponding to the dark portion is transmitted through the first BS 20 on said interface and deviates from the projection optical path, while the G light $S_G$ corresponding to the light portion is reflected and is synthesized with the R light $P_R$ transmitted through the first BS 20 and becomes a light component ($S_B+P_R$), which travels toward the second BS 21 on the interface between the second prism 17 and the third prism 18. Thus, the first BS 20 has the function of color-synthesizing the R light and G light and the function as the analyzer of the second LCD 6 and the third LCD 4, and again in the present embodiment, the second LCD 6 and the third LCD 4 are of a construction which does not have a polarizing filter as an analyzer.

On the other hand, the B light $P_B$ and B light $S_B$ which have emerged from the first LCD 8 first travel toward the air interface 18A of the third prism 18 and are reflected by this interface 18A, and then travel toward the second BS 21 provided on the interface between the second prism 17 and the third prism 18. This second BS 21, as previously described, has the characteristic of reflecting only S-polarized B light and therefore, as regards the B lights which have emerged from the first LCD 8, the B light $P_B$ corresponding to the dark portion is transmitted as indicated by dotted line and deviates from the projection optical path, while the B light $S_B$ corresponding to the light portion is reflected and synthesized with the light component ($S_G+P_R$) transmitted through the second BS 21, by the first BS 20. Thus, this second BS 21 has the function of color-synthesizing the R light, G light and B light and the function as the analyzer of the first LCD 8, and this first LCD 8, like the aforedescribed second and third LCDs 6 and 4, is of a construction which does not have a polarizing filter as an analyzer.

The R light $S_R$, G light $P_G$ and B light $P_B$ corresponding to the dark portions of the respective color images which deviate from the projection optical path are absorbed by the light absorbing layer 24.

The present embodiment has an effect similar to that of the aforedescribed first and second embodiments and also has the effect that the back focal length is shortened to $\sqrt{3}/2 \cdot n$ (n: refractive index of the prisms 16, 17, 18) as converted into air length, relative to the aforedescribed embodiments.

A fourth embodiment of the present invention will now be described with reference to FIG. 5.

Figure 5:
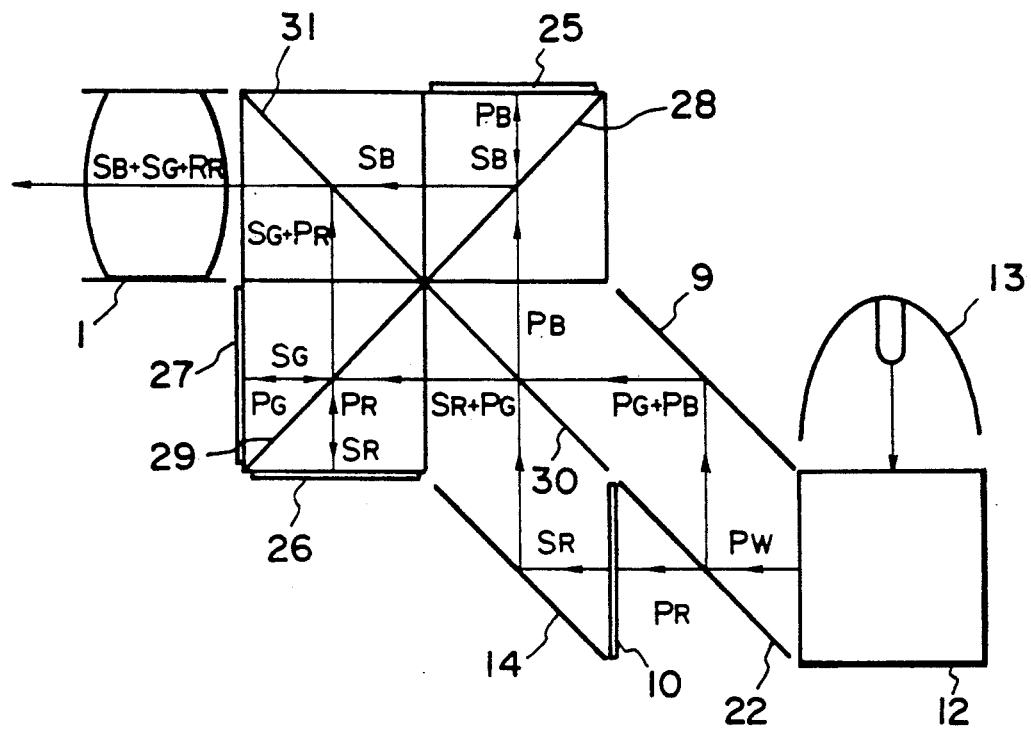
FIG. 5 shows a fourth embodiment of the present invention.

FIG. 5 shows the construction of the fourth embodiment.

In the present embodiment, use is made of first to third reflection type liquid crystal devices (LCDs) 25, 26 and 27 of the electrically controlled birefringence (ECB) type or the 45° twisted nematic (45° TN) type corresponding to lights of respective colors. Each of these first to third LCDs 25, 26 and 27 uses a thin film transistor (TFT) array and is of a construction in which a reflecting mirror serving also as a picture element electrode is further provided on the upper layer of the TFT (Electronic Information Communications Society, 1989 Autumn Meeting C-30). The first LCD 25 is for blue image and is attached to a cube type polarizing beam splitter (BS) 28. The second LCD 26 and the third LCD 27 are for red image and for green image, respectively, and are both attached to a cube type polarizing beam splitter (BS) 29. These BSs 28 and 29 are joined to a cube type third dichroic mirror (DM) 31, and DM 31, BS 28 and BS 29 together form an optical system for synthesizing the lights of respective colors emerging from the first to third LCDs 25, 26 and 27. Further, in the fore stage of the synthesizing optical system, there is provided a separating optical system for color-separating white light emitted by the light source 13 and irradiating the LCDs 25, 26 and 27, said separating optical system being comprised of total reflection mirrors 9 and 14, a λ/2 plate 10, a polarization converting module 12, first and second dichroic mirrors (DMs) 22 and 30 and BS 29.

In the present embodiment, the white light emitted from the light source 13 is converted into P-polarized white light $P_W$ by the polarization converting module 12 and emerges therefrom, and the P-polarized white light $P_W$ is color-divided into R light $P_R$ and a color component ($P_G+P_B$) by the first DM 22. Thereafter, the R light $P_R$ is converted into S-polarized R light $S_R$ via the λ/2 plate 10, and is subsequently reflected by the total reflection mirror 14 and arrives at the second DM 30 having the characteristic of transmitting G light therethrough and reflecting R light and B light.

On the other hand, the light component ($P_G+P_B$) is reflected by the total reflection mirror 9 and arrives at the second DM 30, where the B light $P_B$ is reflected and separated, and the G light $P_G$ is transmitted through the second DM 30 and is synthesized with the R light $S_R$ reflected by the second DM 30 and becomes a light component $(S_R+P_G)$ The B light $P_B$ reflected and separated by the second DM 30 is transmitted through the BS 28 and becomes the illuminating light of the first LCD 25. This B light $P_B$ is reflected by the first LCD 25 and returns to the BS 28, but the B light $P_B$ transmitted through a picture element corresponding to the light portion of the first LCD 25 has its plane of polarization rotated by 90° and becomes S-polarized B light $S_B$, and the B light $P_B$ transmitted through a picture element corresponding to the dark portion of the first LCD 25 and reflected has its plane of polarization not rotated and remains to be the B light $P_B$. Therefore, in the BS 28, the B light $S_B$ corresponding to the light portion is reflected, while the B light $P_B$ corresponding to the dark portion is transmitted and travels back toward the light source 13 along the projection path. Accordingly, the BS 28 provides an analyzer for the first LCD 25, and is of a construction which does not have a polarizing filter as an analyzer, as in the aforedescribed embodiments.

On the other hand, the light component $(S_R+P_G)$ synthesized by the second DM 30 is again separated by the BS 29, and the R light $S_R$ reflected by this BS 29 becomes the illuminating light of the second LCD 26 and the G light $P_G$ transmitted through the BS 29 becomes the illuminating light of the third LCD 27. These second and third LCDs 26 and 27, like the aforedescribed first LCD 25, are of the reflection type and therefore, when each reflected light is transmitted through a picture element corresponding to the light portion and reflected, it becomes a light whose plane of polarization has been rotated by 90° relative to the incident light, and returns to the BS 29 with the light corresponding to the dark portion and having its plane of polarization not rotated. With regard to the reflected light from the second LCD 26, in the BS 29, the R light $P_R$ corresponding to the light portion is transmitted therethrough and the R light $S_R$ corresponding to the dark portion is reflected thereby and returns toward the light source 13. Also, with regard to the reflected light from the third LCD 27, in the BS 29, the G light $S_G$ corresponding to the light portion is reflected thereby and is synthesized with the R light $P_R$ which is the reflected light from the second LCD 26 and transmitted through the BS 29, and the G light $P_G$ corresponding to the dark portion is transmitted therethrough and returns toward the light source 13. Thus, the BS 29 has the color-synthesizing function and the function as an analyzer for the second LCD 26 and the third LCD 27 and therefore, the second LCD 26 and the third LCD 27 each are of a construction which does not have a polarizing filter as an analyzer.

The aforedescribed light component $(S_G+RR)$ synthesized by the BS 29 is reflected by the third DM 31 and at the same time, is synthesized with the B light $S_B$ reflected by the BS 28 and transmitted through the third DM 31. The synthesized light $(S_B+S_G+P_R)$ enters the projection lens 1, and red, green and blue images are enlargedly projected onto a screen, not shown, through the projection lens 1.

The present embodiment has an effect similar to that of the aforedescribed first embodiment and uses reflection type LCDs provided with reflecting mirrors serving also as picture element electrodes and therefore, has the possibility that the numerical aperture of the LCDs themselves can be made great, and has the possibility that higher luminance can be achieved as compared with the aforedescribed embodiments.

Figure 6:
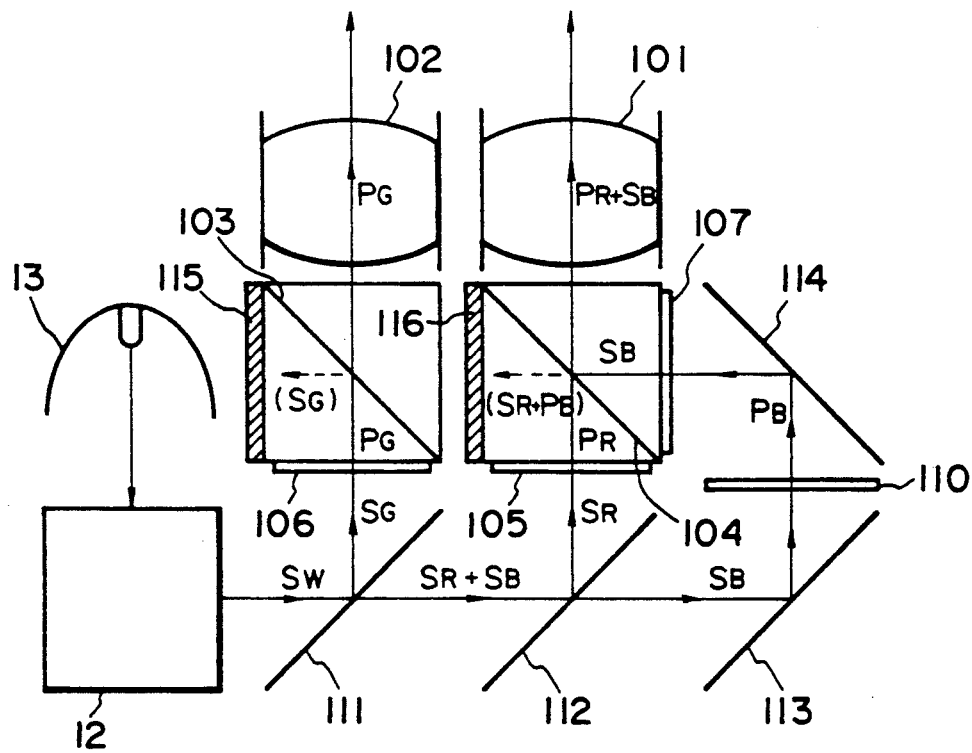
FIG. 6 shows a fifth embodiment of the present invention.

FIG. 6 shows a fifth embodiment of the present invention.

The liquid crystal projector of the present embodiment is provided with a polarization converting module 12 for converting white light emitted by a white light source provided with a high-luminance lamp into rectilinearly polarized light, and is of a construction in which the rectilinearly polarized light is separated into R light, G light and B light of red, green and blue colors, respectively, and as will be described later, by first and second dichroic mirrors (hereinafter referred to as the "DMs") 111 and 112, two total reflection mirrors 113 and 114 and a λ/2 plate 110, the R light, G light and B light are applied to first to third liquid crystal devices (hereinafter referred to as the "LCDs") 105, 106 and 107 for modulating the R light, G light and B light in conformity with a video signal and forming respective color images and the R light and B light which have emerged from the first and third LCDs 105 and 107, respectively, are synthesized by a polarizing beam splitter (hereinafter referred to as the "BS") 104, whereafter the synthesized light is enlargedly projected through a first projection lens 101 and the G light which has emerged from the second LCD 106 is enlargedly projected through a BS 103 and a second projection lens 102, and the synthesized image of red and blue images by the R light and B light projected from the first projection lens 101 and the green image by the G light projected from the second projection lens 102 are superposed one upon the other on a screen, not shown.

The polarization converting module 12, like those in the above-described embodiments, efficiently converts the white light from the light source into rectilinearly polarized light and emits it, and in the present embodiment, it is set so that the white light may become S-polarized white light $S_W$ relative to the first DM 111 located at the destination of emergence thereof.

The first to third LCDs 105, 106 and 107 are of the transmission type forming a red image, a green image and a blue image, respectively, and effect the modulation of illuminating light for each picture element on the basis of primary color video signals for respective color images. This modulation is such that the plane of polarization of the emergent light is rotated by 90° relative to the incident light, and is the same as the modulation effected by the LCDs 4, 6 and 8 in the embodiment shown in FIG. 1.

The first DM 111 has the characteristic of reflecting the G light and transmitting the R light and B light therethrough, and the second DM 112 has the characteristic of reflecting the R light and transmitting the G light and B light therethrough.

Also, in the present embodiment, there are provided a light absorbing layer 116 for absorbing the lights corresponding to the dark portions of the red and blue images which emerge from the first and third LCDs 105 and 107, and a light absorbing layer 115 for absorbing the light corresponding to the dark portion of the blue image which emerges from the second LCD 106.

The operation of the present embodiment will now be described.

The white light emitted from the light source 13 is converted into polarized white light $S_W$ by the polarization converting module 12 and emerges therefrom. This polarized white light $S_W$ first enters the first DM 111 located at the destination of emergence thereof, and is thereby divided into S-polarized G light $S_G$ and a light component $(S_R+S_B)$ of S-polarized R light and B light, and the G light $S_G$ reflected by the first DM 111 becomes the illuminating light of the second LCD 106.

The light component $(S_R+S_B)$ transmitted through the first DM 111 subsequently enters the second DM 112 and is thereby divided into R light $S_R$ and B light $S_B$, and the R light $S_R$ reflected by the second DM 112 becomes the illuminating light of the first LCD 106. The B light $S_B$ is transmitted through the second DM 112, whereafter it is reflected by the total reflection mirror 113 and is transmitted through the $\lambda/2$ plate 110, and has its plane of polarization rotated by 90° by the $\lambda/2$ plate 110 and is converted into P-polarized B light $P_B$. This B light $P_B$ emerges from the $\lambda/2$ plate 110, whereafter it is reflected by the total reflection mirror 114 and becomes the illuminating light of the third LCD 107.

The G light $S_G$ which has become the second LCD 106, as previously described, has its plane of polarization rotated by 90° and emerges as P-polarized G light $P_G$ when it is transmitted through a picture element in the second LCD 106 which corresponds to the light portion of an image indicated by a primary color video signal, and has its plane of polarization not rotated and emerges intactly as the S-polarized G light $S_G$ when it is transmitted through a picture element corresponding to the dark portion of the image indicated by the primary color video signal. The G light $P_G$ and G light $S_G$ which have emerged from the second LCD 106 enter the BS 103 located at the destination of emergence thereof, and the G light $S_G$ corresponding to the dark portion of the green image is reflected by the BS 103 and deviates from the projection optical path and is absorbed by the aforedescribed light absorbing layer 115. On the other hand, the G light $P_G$ corresponding to the light portion of the green image which has been transmitted through the BS 103 is projected onto the screen through the second projection lens 102. In this case, the BS 103 acts as an analyzer for the second LCD 106 and therefore, the second LCD 106 is of a construction which does not have a polarizing filter as an analyzer.

Also, the R light $S_R$ which has become the illuminating light of the first LCD 105, like the aforedescribed G light $S_G$ which has become the illuminating light of the second LCD 106, has its plane of polarization rotated and emerges as P-polarized R light $P_R$ from the first LCD 105 when it is transmitted through a picture element in the first LCD 105 which corresponds to the light portion of an image indicated by the primary color video signal, and emerges intactly as the S-polarized R light $S_R$ when it is transmitted through a picture element corresponding to the dark portion of said image.

On the other hand, the B light $P_B$ which has become the illuminating light of the third LCD 107 has its plane of polarization rotated and emerges as S-polarized B light $S_B$ from the third LCD 107 when it is transmitted through a picture element in the third LCD 107 which corresponds to the light portion of the image indicated by the primary color video signal, and has its plane of polarization not rotated and emerges intactly as the P-polarized B light $P_B$ when it is transmitted through a picture element corresponding to the dark portion of said image.

The R light $P_R$ and R light $S_R$ and the B light $P_B$ and B light $S_B$ which have emerged from the first LCD 105 and the third LCD 107, respectively, as described above, travel toward the BS 104 located at the destination of emergence thereof. At this time, the R light $S_R$ corresponding to the dark portion of the red image which emerges from the first LCD 105 is reflected by the BS 104 and deviates from the projection optical path, and further, the B light $P_B$ corresponding to the dark portion of the blue image which emerges from the third LCD 107 is transmitted through the $S_B$ 104 and deviates from the projection optical path. The R light $S_R$ and B light $P_B$ which have deviated from the projection optical path are both absorbed by the aforedescribed light absorbing layers 116. On the other hand, the R light $P_R$ corresponding to the light portion of the red image which emerges from the first LCD 105 is transmitted through the BS 104 and the B light $S_B$ emerging from the third LCD 107 and corresponding to the light portion of the blue image is reflected by the BS 104 and therefore, the R light $P_R$ and the B light $S_B$ are synthesized into synthesized light $(P_R+S_B)$ by the BS 104, and the synthesized light is enlargedly projected onto a screen, not shown, through the first projection lens 101.

That is, the BS 104 acts as color synthesizing means for synthesizing the R light and the B light and also acts as an analyzer for the first LCD 105 and the third LCD 107 and therefore, the first and third LCDs 105 and 107, like the aforedescribed second LCD 106, are of a construction which does not have a polarizing filter as an analyzer.

A sixth embodiment of the present invention will now be described.

Figure 7:
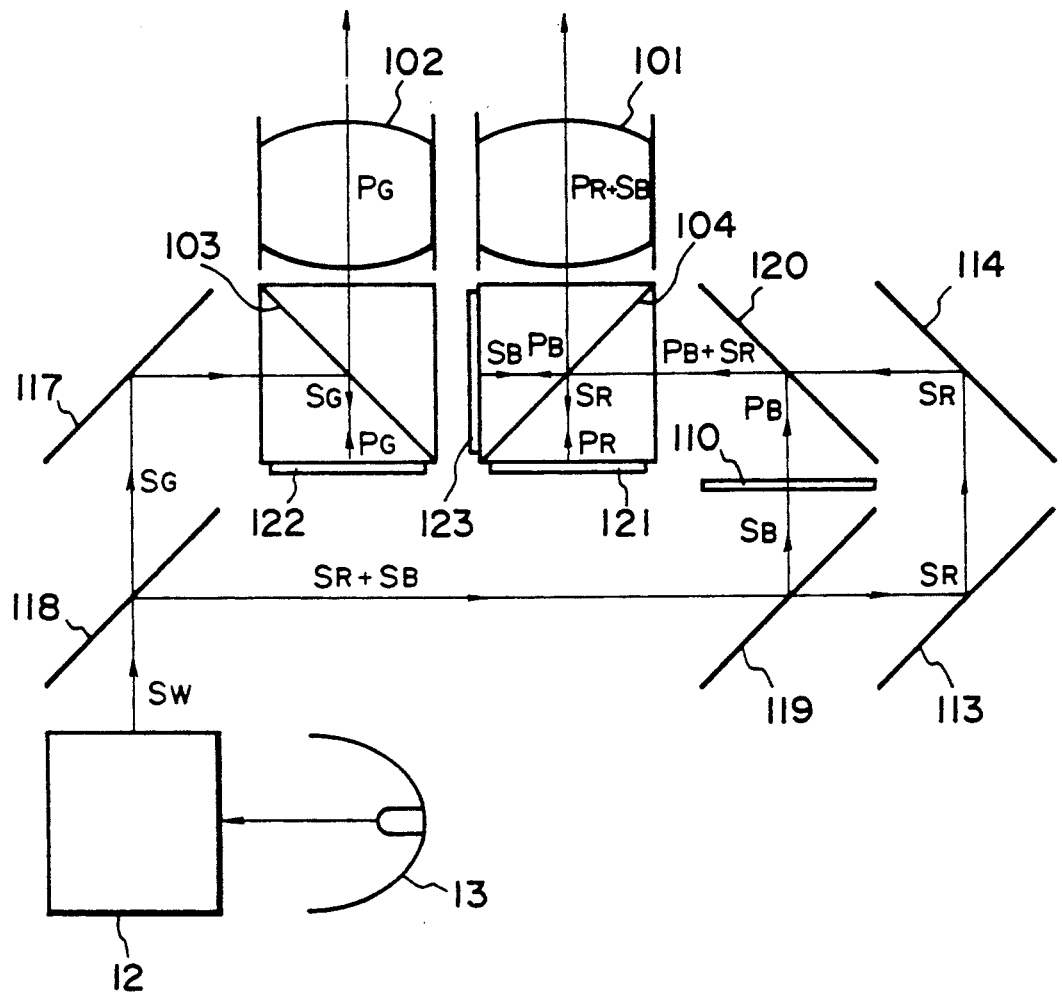
FIG. 7 shows a sixth embodiment of the present invention.

FIG. 7 shows the construction of the sixth embodiment.

In the present embodiment, first to third reflection type LCDs 121, 122 and 123 of the electrically controlled birefringence (ECB) type or the 45° twisted nematic (45° TN) type are used as liquid crystal devices.

The first to third LCDs 121, 122 and 123 are for red image, green image and blue image, respectively, and effect the modulation of illuminating light for each picture element by primary color video signals for respective color images and reflect the illuminating light and emit it.

The present embodiment is of a construction in which rectilinearly polarized light emerging from a polarization converting module 12 is separated into red, green and blue lights by first to third dichroic mirrors (DMs) 118, 119 and 120, total reflection mirrors 113 and 117, a $\lambda/2$ plate 110 and BSs 103 and 104, and the lights of respective colors are applied to the LCDs 121, 122 and 123 and the R light and B light reflected by and emerging from the first and third LCDs 121 and 123, respectively, are synthesized by the BS 104, whereafter the synthesized light is enlargedly projected through a first projection lens 101 and the G light reflected from the second LCD 122 is enlargedly projected through the BS 103 and a second projection lens 102, and a green image by the G light and the synthesized image of red and blue images by the R light and B light are superposed one upon the other on a screen, not shown.

The first DM 118 has the characteristic of transmitting the G light therethrough and reflecting the R light and B light, and the second and third DMs 119 and 120 have the characteristic of reflecting the B light and transmitting the R light and G light therethrough.

The operation of the present embodiment will now be described.

The white light from the light source 13 is converted into S-polarized white light $S_W$ by the polarization converting module 12 and emerges therefrom, and travels toward the first DM 118 located at the destination of emergence thereof. The S-polarized white light $S_W$ is separated into S-polarized G light $S_G$ and a light component ($S_R + S_B$) of S-polarized R light and B light by the first DM 118. The G light $S_G$ transmitted through the first DM 118 is reflected by the total reflection mirror 117, whereafter it is again reflected by the BS 103 and becomes the illuminating light of the second LCD 122. This G light $S_G$ has its plane of polarization rotated by 90° and emerges as P-polarized G light $P_G$ from the second LCD 122 when it enters a picture element in the second LCD 122 which corresponds to the light portion of an image indicated by the primary color video signal and is reflected thereby, and has its plane of polarization not rotated and emerges intactly as the S-polarized G light $S_G$ from the second LCD 122 when it enters a picture element corresponding to the dark portion of said image and is reflected thereby. The G light $P_G$ and G light $S_G$ which have emerged from the second LCD 122 return to the BS 103, and the G light $S_G$ corresponding to the dark portion is reflected by the BS 103, whereafter it returns toward the light source 13 along the same course as the aforedescribed incidence optical path. Also, the G light $P_G$ corresponding to the light portion is transmitted through the BS 103, whereafter it is enlargedly projected onto the screen, not shown, through the second projection lens 102. Accordingly, the BS 103 acts as an analyzer for the second LCD 122 and therefore, the second LCD 122 is of a construction which does not have a polarizing filter as an analyzer.

On the other hand, the light component ($S_R + S_B$) reflected by the first DM 118 subsequently enters the second DM 119 and is separated into R light $S_R$ and B light $S_B$. The B light $S_B$ reflected by this second DM 119 has its plane of polarization rotated by 90° by the λ/2 plate 10, whereafter it travels toward the third DM 120, and the R light $S_R$ transmitted through the second DM 119 is reflected by the total reflection mirror 113, whereafter it is again reflected by the total reflection mirror 114 and travels toward the third DM 120. This third DM 120 has the characteristic of reflecting the B light and transmitting the R light and G light therethrough and therefore, the R light $S_R$ transmitted through the third DM 120 and the B light $P_B$ reflected thereby are synthesized thereby into a light component ($P_B + S_R$), which travels toward the BS 104. In the BS 104, the light component ($P_B + S_R$) is again separated into B light $P_B$ and R light $S_R$, and the B light $P_B$ is transmitted through the BS 104 and becomes the illuminating light of the third LCD 123, while the R light $S_R$ is reflected by the BS 104 and becomes the illuminating light of the first LCD 121. The R light $S_R$ which has become the illuminating light of the first LCD 121, like the aforedescribed G light $S_G$ which has become the illuminating light of the second LCD 122, becomes P-polarized R light $P_R$ and emerges from the first LCD 121 when it enters a picture element corresponding to the light portion and is reflected thereby, and emerges intactly as the R light $S_R$ when it enters a picture element corresponding to the dark portion and is reflected thereby.

On the other hand, the B light $P_B$ which has become the illuminating light of the third LCD 123 has its plane of polarization rotated by 90° and emerges as S-polarized B light $S_B$ from the third LCD 123 when it enters a picture element in the third LCD 123 which corresponds to the light portion of an image indicated by the primary color video signal and is reflected thereby, and has its plane of polarization not rotated and emerges intactly as the P-polarized B light $P_B$ from the third LCD 123 when it enters a picture element corresponding to the dark portion of said image and is reflected thereby.

The R light $S_R$ and R light $P_R$ which have emerged from the first and third LCDs 121 and 123, respectively, in the manner described above travel again toward the BS 104. At this time, the R light $S_R$ which has emerged from the first LCD 121 and corresponds to the dark portion of the red image is reflected by the BS 104 and deviates from the projection optical path, and further, the B light $P_B$ which has emerged from the third LCD 123 and corresponds to the dark portion of the blue image is transmitted through the BS 104 and deviates from the projection optical path. Both of the R light $S_R$ and the B light $P_B$ which deviate from the projection optical path return toward the light source 13 via the same course as the incidence optical path. Also, the R light $P_R$ which has emerged from the first LCD 121 and corresponds to the light portion of the red image is transmitted through the BS 104 and the B light $S_B$ which has emerged from the third LCD 123 and corresponds to the light portion of the red image is reflected by the BS 104 and therefore, the R light $P_R$ and the B light $S_B$ are synthesized by the BS 104 into synthesized light ($P_R + S_B$), which is enlargedly projected onto the screen, not shown, through the first projection lens 101.

Thus, this BS 104 acts as color synthesizing means for synthesizing the R light and the B light and also acts as an analyzer for the first LCD 121 and the third LCD 123 and therefore, the first and third LCDs 121 and 123, like the aforedescribed second LCD 122, are of a construction which does not have a polarizing filter as an analyzer.

The projector described above achieves the following effects.

In the liquid crystal devices, a polarizing filter as an analyzer becomes unnecessary and therefore, there is no temperature rise of the liquid crystal devices caused by the absorption of light by the polarizing filter and it becomes readily possible to increase the intensity of the light of the light source and achieve high luminance.

The polarizing beam splitters provided as the analyzers of the liquid crystal devices serve also as color synthesizing means and therefore, the structure of the optical system becomes simple and the back focal length does not become long.

We claim:
1. An image projector having:
   means for supplying first, second and third lights differing in color from one another and polarized in predetermined directions, respectively;
   a first liquid crystal light modulator for rotating the plane of polarization of said first light in accordance with an input signal to thereby generate a first image by a first polarized light;
   a second liquid crystal light modulator for rotating the plane of polarization of said second light in accordance with an input signal to thereby generate a second image by a second polarized light;
   a third liquid crystal light modulator for rotating the plane of polarization of said third light in accor- dance with an input signal to thereby generate a third image by a third polarized light;

means for projecting said first, second and third images, said projecting means including:

a first polarizing beam splitter disposed at a location whereat said first and second polarized lights from said first and second liquid crystal light modulators intersect each other for reflecting said first polarized light from said first liquid crystal light modulator and transmitting therethrough said second polarized light, from said second liquid crystal light modulator, whereby each of said first and second polarized lights from said first and second liquid crystal light modulators is taken out and synthesized with each other; and a second polarizing beam splitter for taking out said third polarized light from said third liquid crystal light modulator;

wherein said first, second and third images are projected by said first, second and third polarized lights from said first and second polarizing beam splitters.

2. A projector according to claim 1, wherein said projection means has a first projection lens system for projecting said first image and said second image by said first and second polarized lights from said first polarizing beam splitter, and a second projection lens system for projecting said third image by said third polarized light from said second polarizing beam splitter.

3. A projector according to claim 1, wherein said projection means has a single projection lens system, and said first, second and third images are projected by said projection lens system.

4. A projector according to claim 3, wherein said second polarizing beam splitter has predetermined wavelength dependency and is disposed in the optical path of said first and second polarized lights from said first polarizing beam splitter, and said second polarizing beam splitter transmits each of said first and second polarized lights therethrough and reflects said third polarized light from said third liquid crystal light modulator and directs it to said projection lens system.

5. A projector according to claim 3, wherein said projection means has a dichroic mirror for reflecting one of said first and second polarized lights from said first polarizing beam splitter and said third polarized light from said second polarizing beam splitter and transmitting the other therethrough and synthesizing them with each other, and directing the synthesized light to said projection lens system.

6. A projector according to claim 1, wherein said supplying means includes:

a lamp emitting white light;

means for converting said white light into white rectilinearly polarized light; and an optical system provided with a plurality of dichroic mirrors for taking out said first, second and third lights from said white rectilinearly polarized light.

7. A projector according claim 6, wherein said first, second and third liquid crystal light modulators each reflectively rotates said first, second and third lights, and said supplying means directs said first and second lights each to said first and second liquid crystal light modulators through said first polarizing beam splitter and directs said third light to said third liquid crystal light modulator through said second polarizing beam splitter.

8. A projector according to claim 6, wherein said optical system has a ½ wavelength plate in the optical path of said first light for making the plane of polarization of said first light orthogonal to the plane of polarization of said second light.

9. A projector according to any one of claims 1 to 8, wherein said liquid crystal light modulators generate said images by driving the liquid crystal molecules of said liquid crystal light modulators in accordance with video signals of said respective colors.

10. A projector including:

means for supplying first, second and third radiation beams differing in color from one another;

a first light valve for modulating the polarization of said first radiation beam to thereby generate a polarized beam indicative of a first image;

a second light valve for modulating the polarization of said second radiation beam to thereby generate a polarized beam indicative of a second image and having the plane of polarization orthogonal to the plane of polarization of the polarized beam indicative of the first image;

a third light valve for modulating the polarization of said third radiation beam to thereby generate a polarized beam indicative of a third image;

a polarizing beam splitter, disposed where beam paths of said polarized beams from said first and second light valves intersect each other, for directing said polarized beams from said first and second light valves to a common path;

a first projection optical system for receiving said polarized beams generated from said first and second light valves and travelling along said common path from said polarizing beam splitter, and for projecting said first and second images; and a second projection optical system for receiving said polarized beam from said third light valve to project said third image.

11. A projector according to claim 10, wherein said first projection optical system includes a single projection lens system, and said second projection optical system includes a single projection lens system and a polarizing beam splitter is provided between said projection lens system and said third light valve so as to effect filtering of said polarized beam from said third light valve.

12. A projector according to claim 11, wherein said beam supplying means includes:

a lamp;

an optical system for dividing radiation energy from said lamp into said first, second and third radiation beams to direct them to said first, second and third light valves, respectively; and means for defining polarization directions of said first, second and third radiation beams.

13. A projector including:

means for supplying first, second and third radiation beams differing in color from one another;

a first light valve for modulating the polarization of said first radiation beam to thereby generate a polarized beam indicative of a first image;

a second light valve for modulating the polarization of said second radiation beam to thereby generate a polarized beam indicative of a second image and polarized in a direction orthogonal to that of said polarized beam indicative of the first image;

directing means having a third light valve for modulating the polarization of said third radiation beam to thereby generate a polarized beam indicative of a third image, for directing said polarized beam indicative of the third image to a first path;
a polarizing beam splitter, disposed where beam paths of said polarized beams from said first and second light valves intersect each other, for directing said polarized beams from said first and second light valves to a second common path;
a dichroic mirror, disposed where said first path and said second path intersect each other, for directing said polarized beams from said first, second and third light valves to a third common path; and
a projection optical system for receiving said polarized beams generated from said first, second and third light valves and travelling along said third common path from said dichroic mirror to project said first, second and third images.

14. A projector according to claim 13, wherein said beam supplying means includes:
a lamp;
an optical system for dividing radiation energy from said lamp into said first, second and third radiation beams to direct them to said first, second and third light valves; and
means for defining polarization directions of said first, second and third radiation beams.

15. A projector according to claim 13, wherein said directing means has a polarizing beam splitter for effecting filtering of said polarized beam indicative of the third image.

16. A projector including:
means for supplying first and second radiation beams differing in color from each other and both polarized in a first direction to different paths, respectively;
a halfwave plate disposed in path of said first radiation beam so as to convert the polarization of said first radiation beam to a second direction orthogonal to said first direction;
a first light valve for modulating the polarization of said first radiation beam from said halfwave plate to thereby generate a polarized beam indicative of a first image;
a second light valve for modulating the polarization of said second radiation beam to thereby generate a polarized beam indicative of a second image and polarized in a direction orthogonal to that of said polarized beam indicative of the first image;
a polarizing beam splitter, disposed where beam paths of said polarized beams from said first and second light valves intersect each other, for directing said polarized beams from said first and second light valves to a common path; and
a projection optical system for receiving said polarized beams generated from said first and second light vales and travelling along said common path from said polarizing beam splitter to project said first and second images.

17. A projector according to claim 16, wherein said beam supplying means includes:
a lamp;
an optical system for dividing radiation energy from said lamp into said first and second radiation beams to direct them to the paths thereof; and
means for defining polarization directions of said first and second radiation beams to said first direction.

18. A projector including:
means for supplying first, second and third radiation beams differing in color from one another;
a first light valve for modulating the polarization of said first radiation beam to thereby generate a polarized beam indicative of a first image;
a second light valve for modulating the polarization of said second radiation beam to thereby generate a polarized beam indicative of a second image and polarized in a direction orthogonal to that of said polarized beam indicative of the first image;
a third light valve for modulating the polarization of said third radiation beam to thereby generate a polarized beam indicative of a third image to direct said polarized beam indicative of the third image to a first path;
a first polarizing beam splitter, disposed where beam paths of said polarized beams from said first and second light valves intersect each other, for directing said polarized beams from said first and second light valves to a second common path;
a second polarizing beam splitter, disposed where said first path and said second path intersect each other, having dichroic characteristic such that filtering of said polarized beam from said third light valve is effected and said polarized beams from said first, second, and third light valves are directed to third common path; and
a projection optical system for receiving said polarized beams generated from said first, second and third light valves and travelling along said third common path from said second polarizing beam splitter to project said first, second and third images.

19. A projector according to claim 18, wherein said beam supplying means includes:
a lamp;
an optical system for dividing radiation energy from said lamp into said first, second and third radiation beams to direct them toward said first, second and third light valves, respectively; and
means for defining polarization directions of said first, second and third radiation beams.

20. A projector including:
means for supplying first, second and third polarized radiation beams differing in color from one another;
a halfwave plate for causing the polarization direction of said first radiation beam and the polarization direction of said second and third radiation beams to be orthogonal each other;
directing means having a first light valve for modulating the polarization of said first radiation beam from said halfwave plate to thereby generate a polarized beam indicative of a first image, for directing said polarized beam indicative of the first image toward a first path;
a second light valve for modulating the polarization of said second radiation beam to thereby generate a polarized beam indicative of a second image and polarized in a direction orthogonal to that of said polarized beam indicative of the first image;
a third light valve for modulating the polarization of said third radiation beam to thereby generate a polarized beam indicative of a third image and polarized in a direction orthogonal to that of said polarized beam indicative of the first image;

a dichroic mirror, disposed where beam paths of said polarized beams from said second and third light valves intersect each other, for directing said polarized beams from said first and second light valves toward a second common path;

a beam splitter, disposed where said first path and said second path intersect each other, for directing said polarized beams from said first, second and third light valves toward a third common path; and a projection optical system for receiving said polarized beams generated from said first, second and third light valves and travelling along said third path from said second polarizing beam splitter to project said first, second and third images.

21. A projector including:

means for supplying first, second and third polarized radiation beams differing in color from one another;

a halfwave plate for causing the polarization direction of said first radiation beam and the polarization direction of said second and third radiation beams to be orthogonal to each other;

a first light valve for modulating the polarization of said first radiation beam to thereby generate a polarized beam indicative of a first image;

a second light valve for modulating the polarization of said second radiation beam to thereby generate a polarized beam indicative of a second image and polarized in a direction orthogonal to that of said polarized beam indicative of the first image;

a third light valve for modulating the polarization of said third radiation beam to thereby generate a polarized beam indicative of a third image and polarized in a direction orthogonal to that of said polarized beam indicative of the first image, and for directing said polarized beam indicative of the third image toward a first path;

a first polarizing beam splitter, disposed where beam paths of said polarized beams from said first and second light valves intersect each other, for directing said polarized beams from said first and second light valves toward a second common path;

a second polarizing beam splitter, disposed where said first path and said second path intersect each other, having a dichroic characteristic such that filtering of said polarized beam from said third light valve is effected and said polarized beams from said first, second and third light valves are directed toward a third common path; and a projection optical system for receiving said polarized beams generated from said first, second and third light valves and travelling along said third path from said second polarizing beam splitter to project said first, second and third images.

22. A projector including:

means for supplying first, second and third polarized radiation beams differing in color from one another;

a halfwave plate for causing the polarization direction of said first radiation beam and the polarization direction of said second and third radiation beams to be orthogonal to each other;

a first light valve for modulating the polarization of said first radiation beam to thereby generate a polarized beam indicative of a first image;

a second light valve for modulating the polarization of said second radiation beam to thereby generate a polarized beam indicative of a second image and polarized in a direction orthogonal to that of said polarized beam indicative of the first image;

a third light valve for modulating the polarization of said third radiation beam to thereby generate a polarized beam indicative of a third image and polarized in a direction orthogonal to that of said polarized beam indicative of the first image, and for directing said polarized beam indicative of the third image toward a first path;

a first polarizing beam splitter, disposed where beam paths of said polarized beams from said first and second light valves, for directing said polarized beams from said first and second light valves toward a second common path;

a dichroic mirror, disposed where said first path and said second path intersect each other, for directing said polarized beams from first, second and third light valves toward a third common path; and a projection optical system for receiving said polarized beams generated from said first, second and third light valves and travelling along said third path from said dichroic mirror to project said first, second and third images.

* * * * *